(12) United States Patent
Provines

(10) Patent No.: US 7,249,391 B1
(45) Date of Patent: Jul. 31, 2007

(54) GRAIN DRILL DEPTH ADJUSTMENT TOOL

(76) Inventor: Wynn Provines, Route 2, Box 74, Vandalia, IL (US) 62471

( * ) Notice: Subject to any disclaimer, the term of this patent is extended or adjusted under 35 U.S.C. 154(b) by 368 days.

(21) Appl. No.: 11/008,039

(22) Filed: Dec. 9, 2004

(51) Int. Cl.
 *B25F 1/00* (2006.01)
(52) U.S. Cl. .............................. 7/170; 111/200; 111/900
(58) Field of Classification Search .................... 7/100, 7/114, 151, 166, 170; 111/200, 900
 See application file for complete search history.

(56) References Cited

U.S. PATENT DOCUMENTS 4,611,545 A * 9/1986 Nickeson et al. ............. 111/52

* cited by examiner

*Primary Examiner*—Christopher J. Novosad
(74) *Attorney, Agent, or Firm*—Kevin L. Klug

(57) ABSTRACT

An improved grain drill depth adjustment tool for changing the seeding depth of a John Deere® Model 750 Grain Drill or its equivalent. The improved grain drill depth adjustment tool capable of unlocking a locked grain drill depth adjustment plate, repositioning the grain drill depth adjustment plate and allowing the grain drill depth adjustment plate to be re-locked in an alternate position. The improved grain drill depth adjustment tool comprising a lever; an engagement member attached to the lever; and a plurality of protrusions attached to the lever. The improved grain drill depth adjustment tool capable of performing its functions in a one-handed operation without the use of auxiliary tools. The one-handed operation requires minimal force and the tool is relatively easy to use. The grain drill depth adjustment tool is further capable of reducing adjustment time and thereby increasing farming efficiencies.

12 Claims, 9 Drawing Sheets

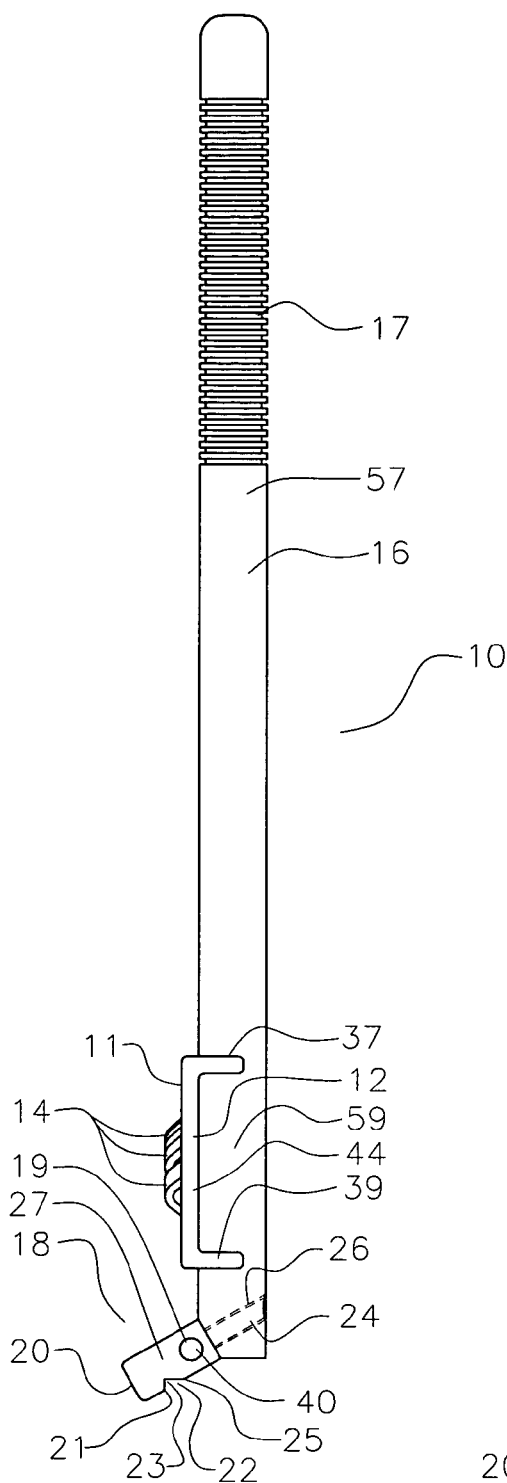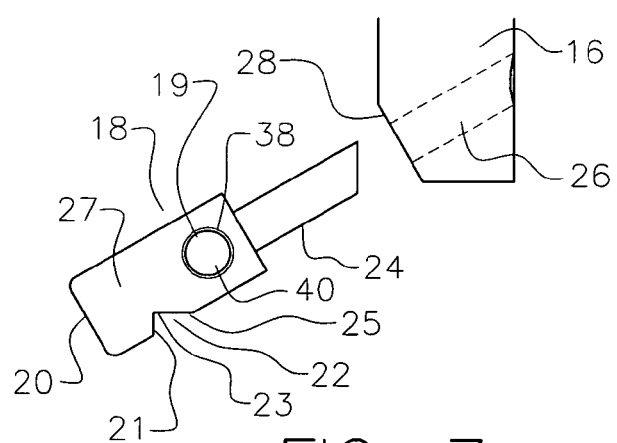
FIG. 6
FIG. 7

GRAIN DRILL DEPTH ADJUSTMENT TOOL

BACKGROUND OF THE INVENTION

The present invention relates in general to hand tools for use with specific farm equipment and/or specialized mechanical implements. More specifically, the tool of the present invention provides improved mechanical assistance for moving the multiple depth adjustment plates on John Deere® Model 750 Grain Drill or its equivalent. The improved grain drill depth adjustment tool provides for true one-handed adjustment which represents a significant improvement over the conventional adjustment tool included with the grain drill. Additionally, the improved grain drill depth adjustment tool significantly reduces the setup time required whenever the seeding depth is changed. A commercial grain drill is typically available in a wide variety of sizes to suit the particular application and need. A thirty foot wide grain drill with forty-eight rows spaced approximately seven and one-half inches apart is one example. The thirty foot grain drill has forty-eight individual grain drill depth adjustment assemblies primarily consisting of a pivot shaft/bearing assembly, a spring-loaded pin, and a grain drill depth adjustment plate which must be manually adjusted each time the planting depth is varied. The grain drill depth adjustment plate has a square-shaped aperture which provides a means for rotational adjustment of the plate; and a plurality of elongated apertures capable of receiving the spring-loaded pin such that the plate can be locked into position. These grain drills were provided with a depth adjustment tool consisting of an approximate three-quarter inch diameter, twelve-inch long metal handle, having an approximate two inch length of one-half inch square bar stock welded at a ninety degree angle to the handle. The one-half inch square bar stock of the provided depth adjustment tool fits into the approximate one half-inch square-shaped aperture on each of the individual depth adjustment plates. The John Deere® grain drill's instruction manual suggests using their provided tool in combination with a conventional open-end wrench to release a spring-loaded pin thereby allowing the provided depth adjustment tool to rotate the depth adjustment plate and thereby vary seeding depth. The open-ended wrench merely functions as a spanner or a pry bar as do other popular alternatives, such as a large bladed screwdriver. Some of these depth adjustment plates are difficult to access and require someone to climb over or under the implement frame, crouch or crawl among the individual row units, and reach each individual depth adjustment plate and the corresponding spring-loaded pin for each row unit with both hands in order to change the seeding depth. It is often very difficult for someone to balance in these awkward positions while having to use both hands to position each individual adjustment plate. Additionally, the individual adjustment plates can be difficult to move without first reducing the pressure that the weight of the grain drill's gauge wheels transfer to the spring-loaded pins and therefore the adjustment process requires a balancing act between the provided depth adjustment tool in one hand and the conventional open-end wrench or other pry bar type tool in the other hand. Accumulated dirt, debris and/or rust can compound the adjustment process thereby making this balancing act even more difficult. This conventional two-handed operation typically requires between forty to fifty minutes to adjust all forty-eight depth adjustment plates on a thirty foot grain drill. Smaller grain drills having less row units and therefore less adjustment plates would require less setup time and conversely larger grain drills would require more setup time. The present art improved grain drill depth adjustment tool accomplishes this task without the need for an additional spanner or pry bar type tool and thus provides for true one-handed operation. The improved grain drill depth adjustment tool provides means for both engaging the depth adjustment plate and releasing the corresponding spring-loaded pin thereby allowing the depth adjustment plate to be easily rotated to achieve the desired seeding depth. This one-handed operation typically takes about ten minutes to adjust all forty-eight depth adjustment plates on a thirty foot grain drill thereby resulting in increased efficiency through significant time savings.

Accordingly, it is an object of the present invention to provide an improved grain drill depth adjustment tool which is capable of unlocking, repositioning and allowing re-locking of the grain drill's depth adjustment plate without the need of additional auxiliary devices.

Another object of the present invention is to provide an improved grain drill depth adjustment tool which is capable of unlocking, repositioning and allowing re-locking of the grain drill's depth adjustment plate while only requiring the use of one-hand in order to perform these functions.

A further object of the present invention is to provide an improved grain drill depth adjustment tool which increases the efficiency of the seeding depth adjustment process by reducing adjustment time and thereby increasing agricultural productivity.

Still a further object of the present invention is to provide an improved grain drill depth adjustment tool which requires minimal force and is relatively easy to use.

SUMMARY OF THE INVENTION

To accomplish the foregoing and other objects of this invention there is provided an improved grain drill depth adjustment tool for adjusting the seeding depth on a John Deere® Model 750 Grain Drill or its equivalent. The improved grain drill depth adjustment tool comprises a lever, an engagement member attached to the lever, and a plurality of protrusions also attached to the lever.

In the preferred embodiment, the engagement member further comprises a key member, the key member of the improved grain drill depth adjustment tool is capable of being received within the square-shaped aperture of the grain drill depth adjustment plate thereby providing both alignment means for positioning the tool and the tools's primary engagement means for rotating the grain drill depth adjustment plate.

The plurality of protrusions positioned such that they are capable of being at least partially received within the plurality of elongated apertures of the grain drill's depth adjustment plate when the key member is received within the square-shaped aperture of the grain drill depth adjustment plate. When received within the plurality of elongated apertures of the grain drill depth adjustment plate, the plurality of protrusions are further capable of compressing the spring-loaded pin, previously received within the plurality of apertures as part of the grain drill depth adjustment assembly, such that when the spring-loaded pin is compressed, the spring-loaded pin is no longer received within the plurality of elongated apertures and the grain drill depth adjustment plate is essentially unlocked and free to rotate to achieve alternate seeding depth positions. The plurality of protrusions of the grain drill depth adjustment tool are also capable of both keeping the spring-loaded pin from being re-received within the plurality of elongated apertures during the adjustment process and allowing the compressed spring-loaded pin to be released after the adjustment process, such that the spring-loaded pin is again received within the plurality of elongated apertures and the grain drill depth adjustment plate is essentially re-locked. The plurality of protrusions further providing secondary engagement means for rotating the grain drill depth adjustment plate.

BRIEF DESCRIPTION OF THE DRAWINGS

Numerous other objects, features, and advantages of the invention should now become apparent upon a reading of the following detailed description taken in conjunction with the accompanying drawings, in which:

FIG. 6 is a left side view of the preferred embodiment of the improved grain drill depth adjustment tool;

FIG. 7 is a detail view of the preferred embodiment of the left side of the key member and the left side bottom portion of the lever of the improved grain drill depth adjustment tool further illustrating the preferred attachment method.

DETAILED DESCRIPTION

Figure 1:
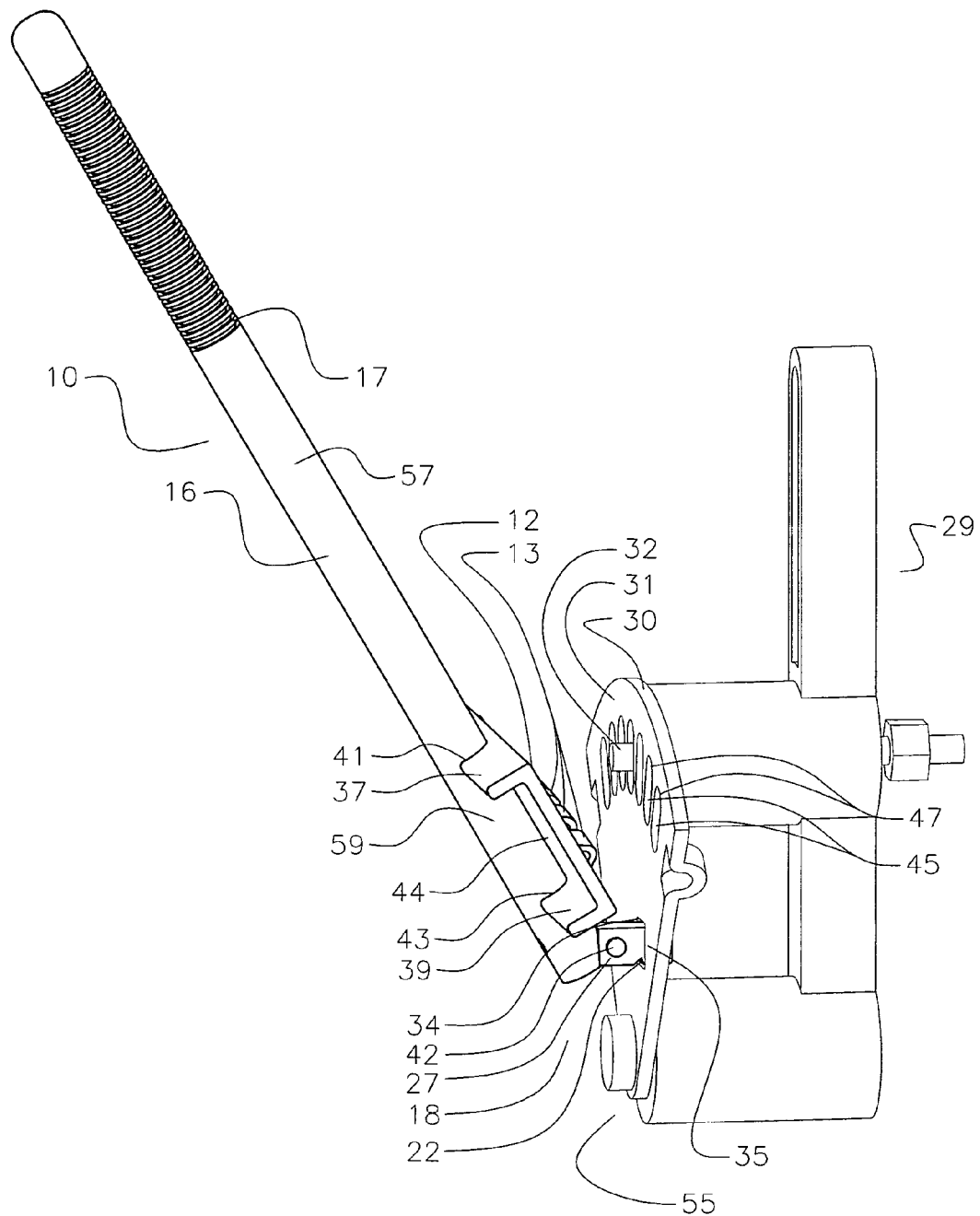
FIG. 1 is a front side perspective view of a preferred embodiment of the improved grain drill depth adjustment tool shown in combination with a John Deere® Model 750 grain drill depth adjustment plate.

Referring now to the drawings, a preferred embodiment of the improved grain drill depth adjustment tool is shown in FIGS. 1-9. The improved grain drill depth adjustment tool 10 is described in conjunction with a conventional grain drill depth adjustment assembly 29 such as one provided on a John Deere® Model 750 Grain Drill or its equivalent.

Figure 2:
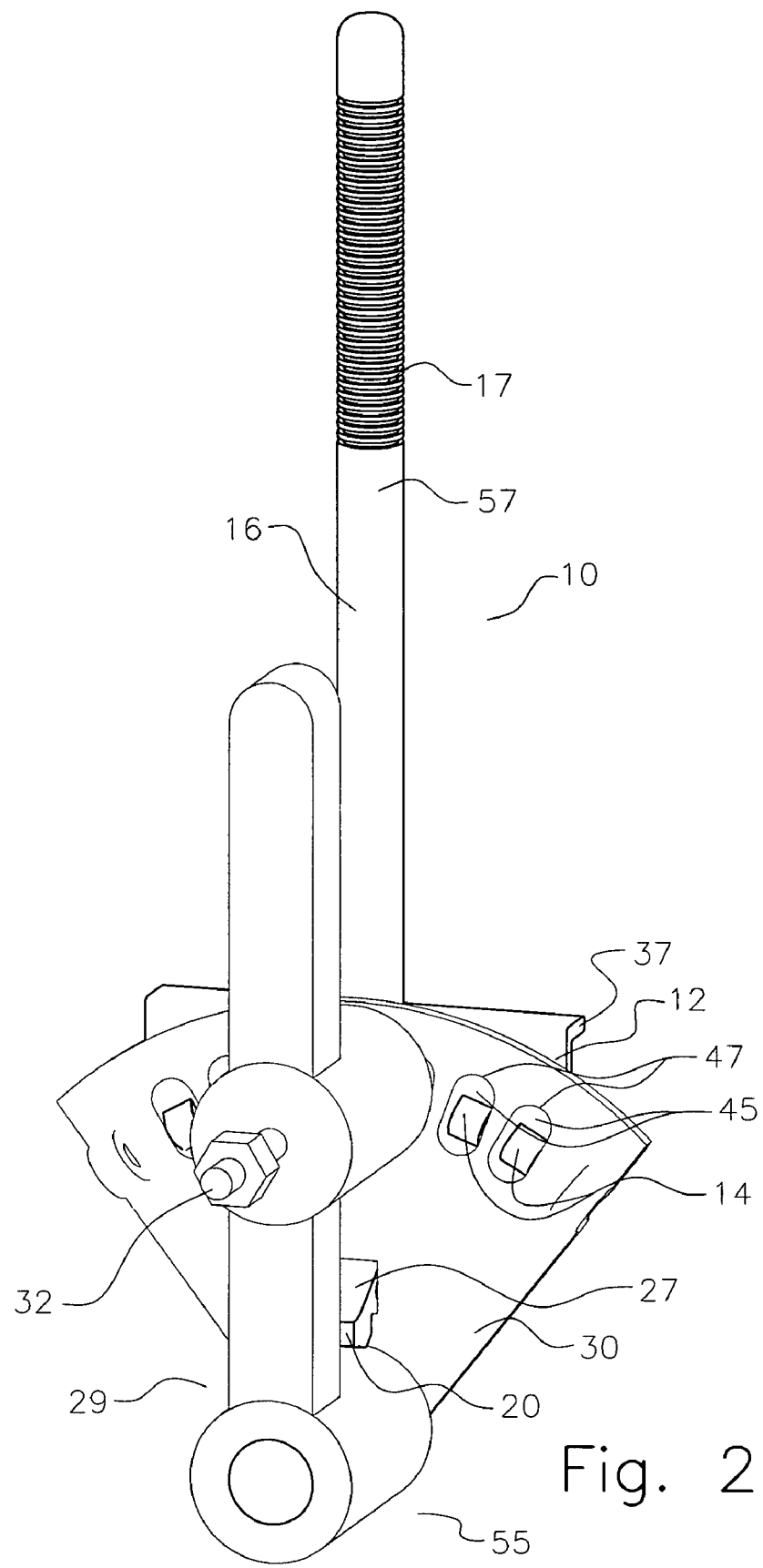
FIG. 2 is a rear perspective view of a preferred embodiment of the improved grain drill depth adjustment tool shown in combination with a John Deere® Model 750 grain drill depth adjustment plate.
Figure 3:
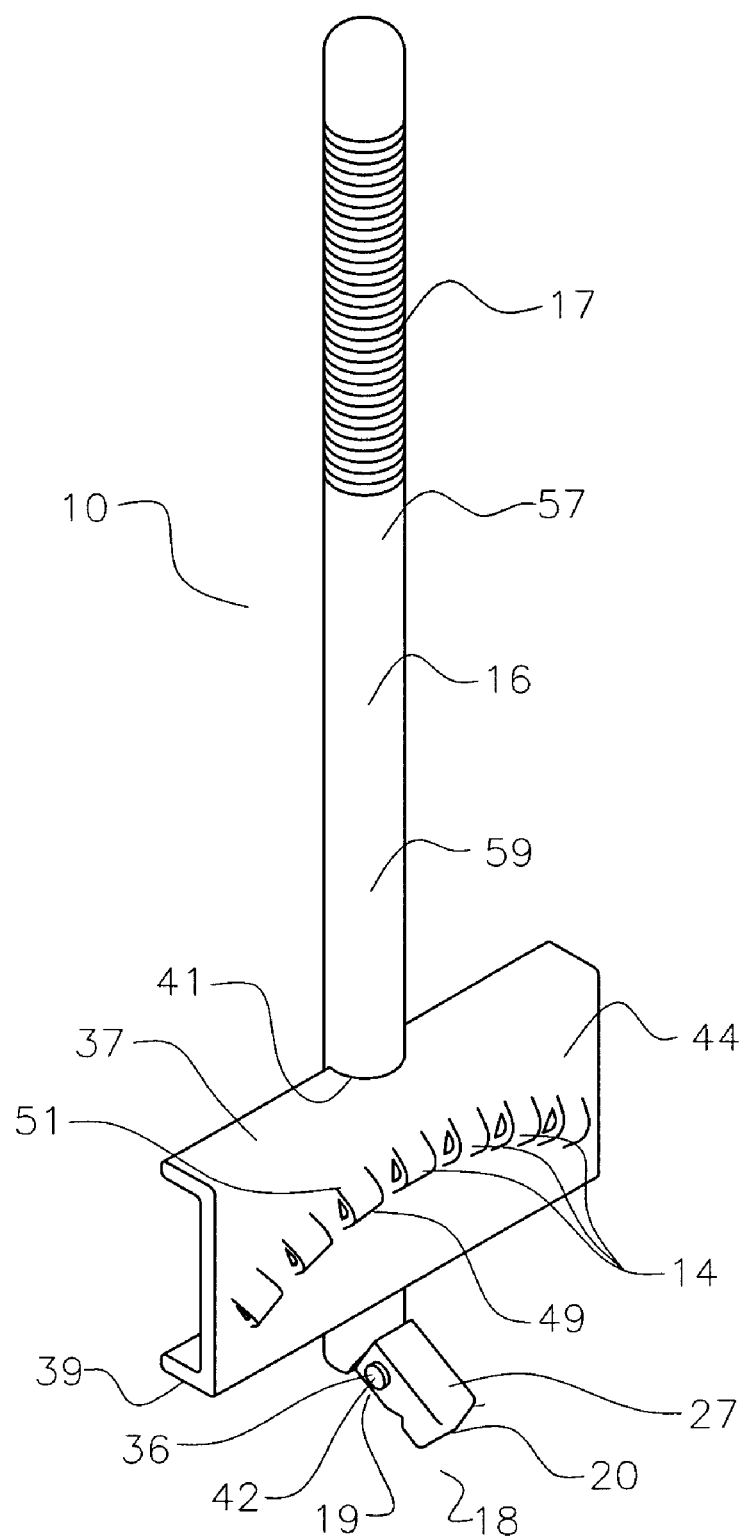
FIG. 3 is a front perspective view of a preferred embodiment of the improved grain drill depth adjustment tool.
Figure 4:
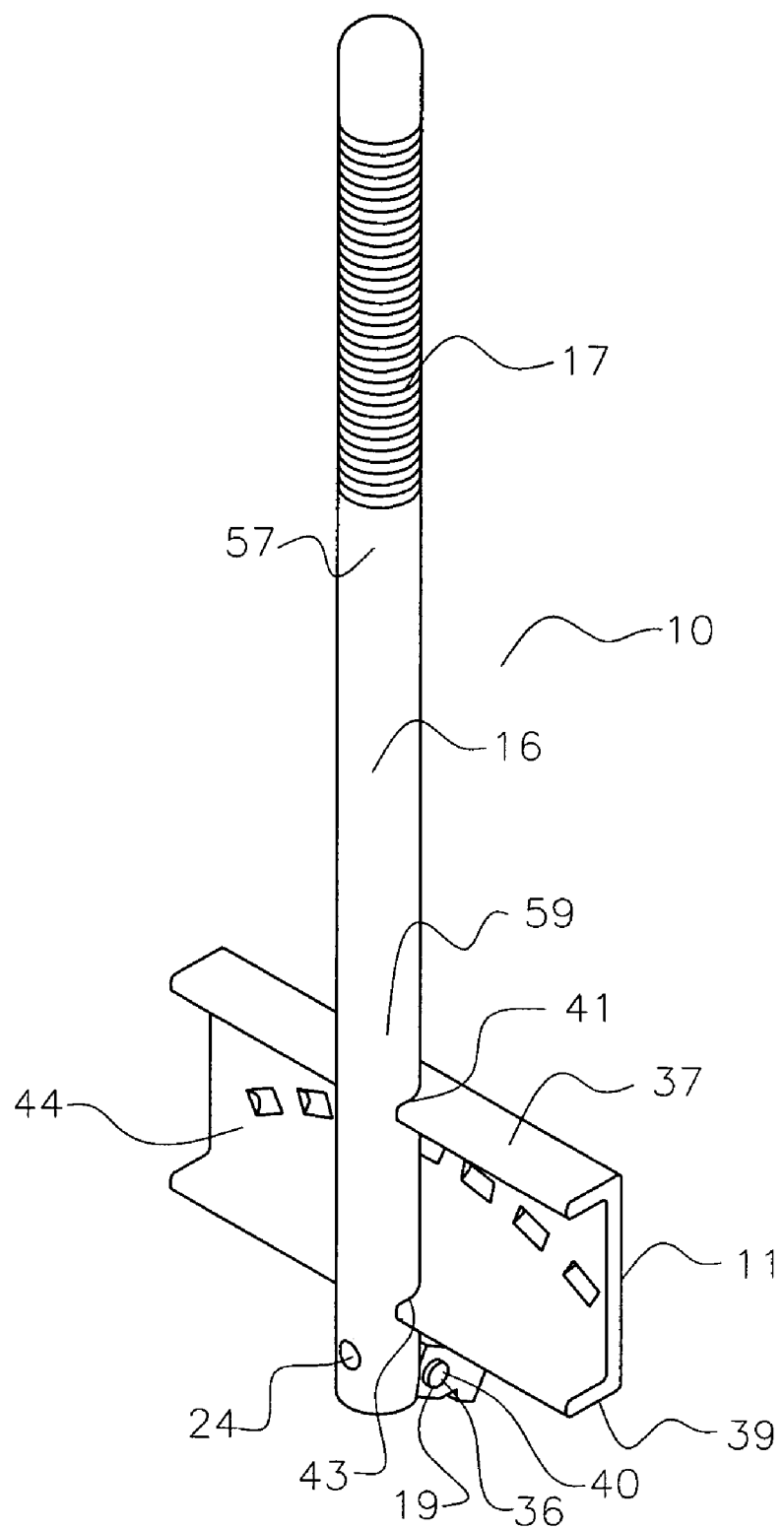
FIG. 4 is a rear perspective view of a preferred embodiment of the improved grain drill depth adjustment tool.
Figure 5:
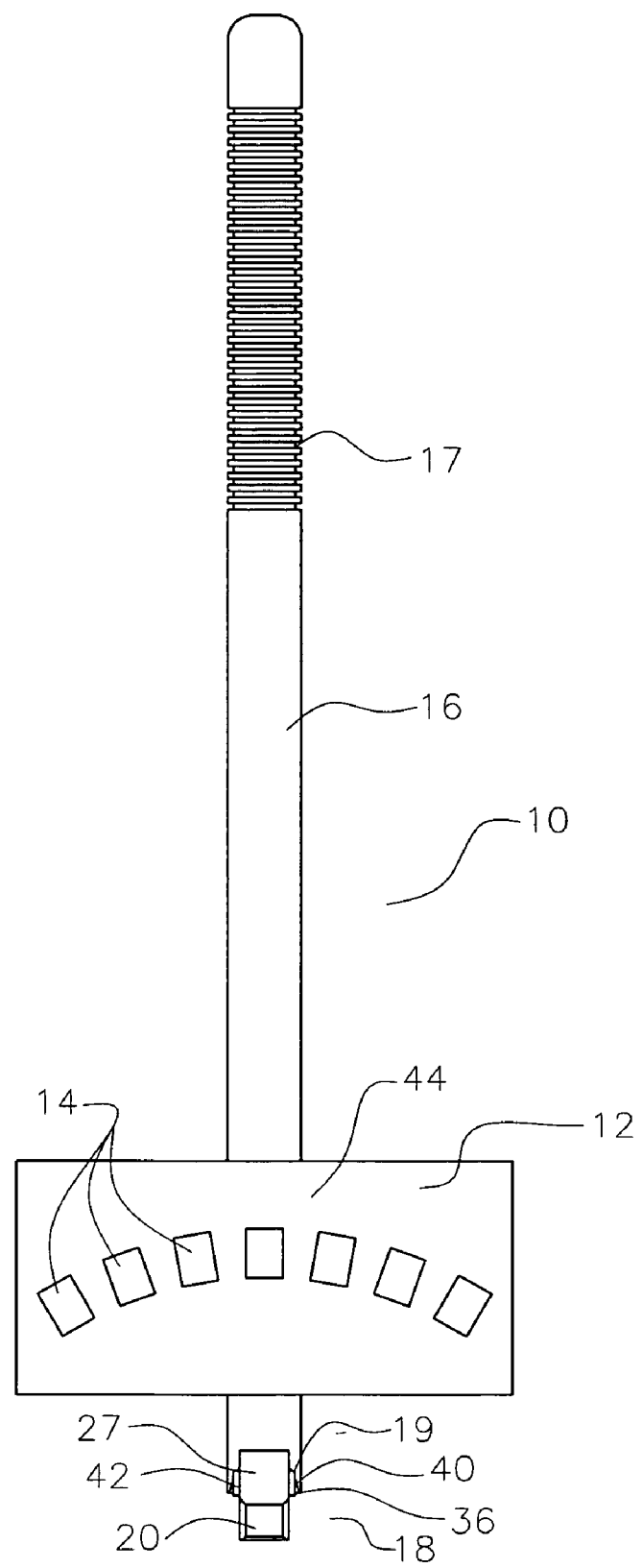
FIG. 5 is a top plan view of the preferred embodiment of the improved grain drill depth adjustment tool.
Figure 8:
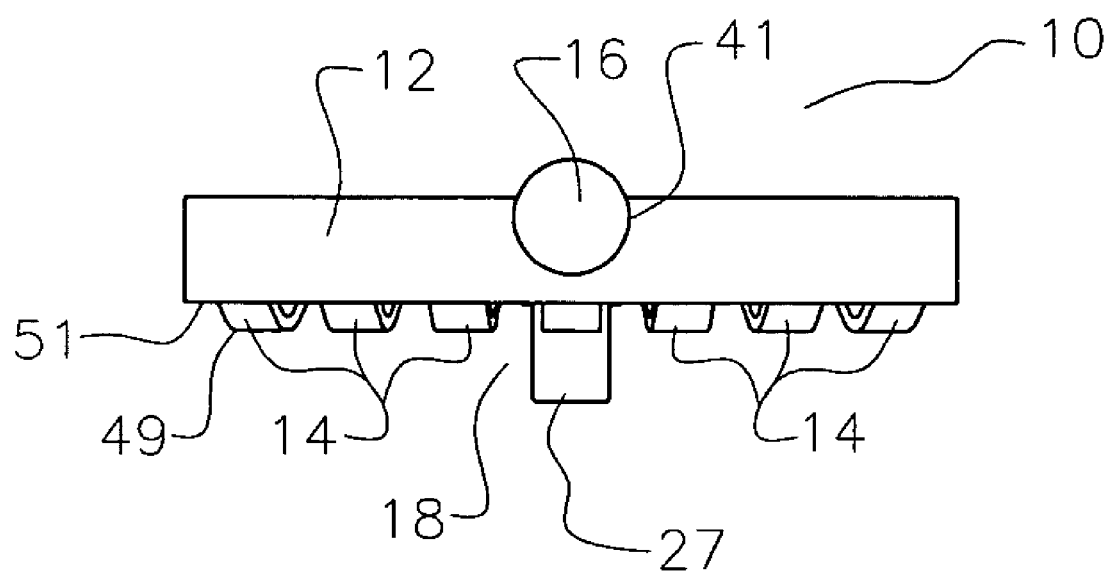
FIG. 8 is a top view of the preferred embodiment of the improved grain drill depth adjustment tool.
Figure 9:
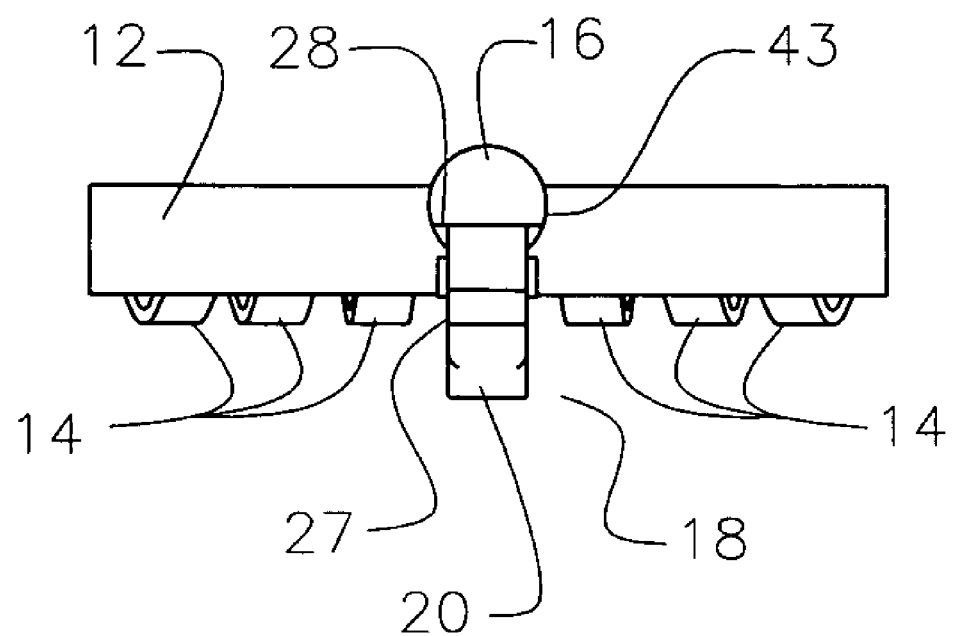
FIG. 9 is a bottom view of the preferred embodiment of the improved grain drill depth adjustment tool.

FIGS. 1-2 of the drawings, show the improved grain drill depth adjustment device 10 in combination with the grain drill depth adjustment assembly 29. The grain drill depth adjustment assembly 29 primarily consists of a pivot shaft/bearing assembly 55, a spring-loaded pin 32, and a grain drill depth adjustment plate 30.

In the preferred embodiment the improved grain drill depth adjustment tool 10 has a lever 16, an engagement member 18 attached to the lever 16 and a plurality of protrusions 14 attached to the lever 16.

The lever 16 provides mechanical leverage and functions as the tool's platform for both attachment and alignment of the engagement member 18 in its relationship to the plurality of protrusions 14 also attached to the lever 16.

The engagement member 18 attached to the lever 16 is preferably a key member 27 capable of being received within the square-shaped aperture 34 of the grain drill's depth adjustment plate 30 such that the improved grain drill depth adjustment tool 10 is capable of being properly aligned and positioned for the plurality of protrusions 14 to be received within the plurality of elongated apertures 45.

The key member 27 having a locking notch 22 capable of at least partially receiving a first edge margin 35 adjacent to the square-shaped aperture 34 of the grain drill depth adjustment plate 30 such that the locking notch 22 of the improved grain drill depth adjustment tool 10 can be pivoted on said first edge margin 35 thereby providing mechanical leverage for the plurality of protrusions 14 to compress the spring-loaded pin 32 in order that the grain drill depth adjustment plate 30 can be rotated. The key member 27 further providing primary engagement means such that contact with said first edge margin 35 allows the improved grain drill depth adjustment tool 10 to rotate the grain drill depth adjustment plate 30.

The plurality of protrusions 14 are capable of being at least partially received within the plurality of elongated apertures 45 of the grain drill depth adjustment plate 30 such that the plurality of protrusions 14 are capable of compressing the corresponding spring-loaded pin 32 so that the spring-loaded pin 32 is no longer even partially received within the plurality of elongated apertures 45 and the grain drill depth adjustment plate 30 is essentially unlocked. The plurality of protrusions 14 of the improved grain drill depth adjustment tool 10 are further capable of keeping the spring-loaded pin 32 in a compressed position and subsequently releasing the spring-loaded pin 32, after the grain drill depth adjustment plate 30 has been rotated, such that the spring-loaded pin 32 is again at least partially received within the plurality of elongated apertures 45 of the grain drill depth adjustment plate 30. The grain drill depth adjustment plate 30 further having a second edge margin 45 adjacent the plurality of elongated apertures 45. Contact by the plurality of protrusions 14 with said second edge margin 45 also provides secondary engagement means thereby assisting with the rotation of the grain drill depth adjustment plate 30.

In the preferred embodiment described herein, the lever 16 is cylindrical and has atop portion 57 or handle, with a slip resistant surface 17; and a bottom portion 59 having a substantially square-shaped recessed area 28 capable of at least partially receiving the key member 27, and an attachment aperture 26 capable of receiving an attachment pin 24 of the key member 27. Both the substantially square-shaped recessed area 28 and the attachment aperture 26 at an approximate thirty degree angle or less to the axis of the lever 16. In some embodiments, the bottom portion 59 of the lever 16 has the substantially square-shaped recessed area 28 and a depression capable of receiving the attachment pin 24 of the engagement member. The depression also at an approximate thirty degree angle or less to the axis of the lever 16 but the depression not extending completely through the lever 16 as does the attachment aperture 26.

A support member 12 is preferably attached to the bottom portion 59 of the lever 16. The lever 16 may be manufactured from different materials and in different sizes and shapes but is preferably formed from conventional plain carbon steel rod (e.g. 1020 steel or its equivalent) approximately three-quarter of an inch in diameter and approximately fifteen inches long. The slip resistant surface 17 is preferably a plurality of grooves or knurling but could be any slip resistant surface whether cut or machined into the top portion 57 of the lever 16 or attached or applied to the top portion 57 of the lever 16 itself.

In the preferred embodiment, the engagement member 18 comprising the key member 27 further comprising a locking notch 22, a first surface 21 adjacent to the locking notch 22, a second surface 23 adjacent the locking notch 22 and also adjacent and perpendicular the first surface 21, one or more key member stops 19, an alignment point 20 opposite the attachment pin 24, and the attachment pin 24.

The locking notch 22 preferably at an approximate thirty degree angle or less to the axis of the key member 27 itself such that when the key member 27 is subsequently received and attached to the square-shaped recessed area 28 and the attachment pin 24 is received within the attachment aperture 26 of the lever 16; the key member 27 is now at an approximate thirty-degree angle to the axis of the lever 16 and the locking notch 22 is now effectively at an approximate zero-degree angle with respect to the axis of the lever 16. The locking notch 22 of the key member 27 located such that when the key member 27 is attached to the lever 16 and the improved grain drill depth adjustment tool 10 is held essentially upright as if in operational use, the first surface 21 adjacent the locking notch 22 is essentially in vertical alignment with a maximum protrusion surface 49 of the plurality of protrusions 14; and an edge margin 25 of the second surface 23 adjacent the locking notch 22 is also in essential vertical alignment with a minimum protrusion surface 51 of the plurality of protrusions 14; or as in the preferred embodiment, the edge margin 25 of the second surface 23 adjacent the locking notch 22 is also in essential vertical alignment with a front surface 11 of the support member 12.

Preferably, the locking notch 22 is approximately one-eighth of an inch deep. Also, in the preferred embodiment, the plurality of protrusions 14 protrude approximately three-sixteenths of an inch from the front surface 11 of the support member 12. Accordingly, in the preferred embodiment, the maximum protrusion surface 49 is approximately three-sixteenths of an inch from the front surface 11 of the support member 12; however the minimum protrusion surface 51 is approximately equivalent to the front surface 11 of the support member 12 and as such does not effectively protrude from the support member 12 as does the maximum protrusion surface 49.

The one or more key member stops 19 are attached to the key member 27 such that the one or more key member stops 19 effectively prevent over-insertion of the key member 27 in the square-shaped aperture 34 of the grain drill depth adjustment plate 30. The one or more key member stops provide both positioning means and pivot means so that the one or more key member stops 19 can be pivoted on said first edge margin 35 adjacent the square-shaped aperture 34 of the grain drill depth adjustment plate 30 thereby providing additional mechanical leverage for the plurality of protrusions 14 to compress the spring-loaded pin 32 in order that the grain drill's depth adjustment plate 30 can be rotated. In the preferred embodiment, the one or more key member stops further comprising a stop pin 36. Also, in the preferred embodiment, the key member 27 has a stop aperture 38 extending completely through the key member 27 for receiving the stop pin 36. When inserted in the stop aperture 38, the stop pin 36 extends out of the stop aperture 38 on both sides and thereby forms a first stop pin extension 40 and an opposite second stop extension 42 such that the first and second stop extensions 40, 42 function as the one or more key member stops 19 in the preferred embodiment.

The stop pin 36 may be manufactured from different materials and in different sizes and shapes but in the preferred embodiment is a one-eighth inch diameter steel roll pin approximately three-quarters of an inch long; and when properly inserted in the stop aperture 38 extends out of the stop aperture 38 approximately one-eighth of an inch on each side.

The alignment point 20 of the key member 27 is for facilitating positioning of the improved grain drill depth adjustment tool 10 and easing the insertion and withdrawal of the improved grain drill depth adjustment tool 10 with respect to the square-shaped aperture 34 of the grain drill depth adjustment plate 30. In the preferred embodiment, the alignment point 20 comprising a partially rounded face or a partially faceted face. The attachment pin 24 in combination with the attachment aperture 26 and the square-shaped recessed area 28 of the lever 16 provide additional support and strength for the key member attachment means. Preferably, the key member attachment means is a weld which joins the key member to the lever.

The key member 27 may also be manufactured from different materials and in different sizes and shapes but in the preferred embodiment is a one-half inch square shaft formed from conventional plain carbon steel bar stock (e.g. 1045 steel or its equivalent).

In one alternate embodiment, the engagement member 18 comprising one or more adjustment plate grips which are capable of gripping an outer edge margin of the grain drill depth adjustment plate 30 and thereby providing an alternate pivot point such that the plurality of protrusions 14 are capable of being received within the plurality of elongated apertures 45. Preferably, the support member 12 further comprising the one or more adjustment plate grips in this alternate embodiment. This alternate embodiment does not utilize the first edge margin 35 adjacent the square-shaped aperture 34 of the grain drill depth adjustment plate 30 as a pivot point, as does the preferred embodiment.

In other alternate embodiments, the engagement member 18 comprises a hooking member which is capable of attaching to the pivot shaft/bearing assembly 55 of the grain drill depth adjustment assembly 29 and thereby providing another pivot point such that the plurality of protrusions 14 are capable of being received within the plurality of elongated apertures 45. Preferably, the bottom portion 59 of the lever 16 further comprising the hooking member in this other alternate embodiment. This other alternate embodiment also does not utilize the first edge margin 35 adjacent the square-shaped aperture 34 of the grain drill depth adjustment plate 30 as a pivot point, as does the preferred embodiment.

In preferred form, the improved grain drill depth adjustment tool 10 further comprises the support member 12 attached to the bottom portion 59 of the lever 16. The support member 12 providing a base for the plurality of protrusions 14 such that they can be positioned to correspond to the plurality of elongated apertures 45. In the preferred embodiment, the plurality of protrusions 14 are stamped out of the support member 12 such that they protrude approximately three-sixteenths of an inch or more and can effectively fill the plurality of elongated apertures 45 on the depth adjustment plate 30 of the John Deere® Model 750 Grain Drill or its equivalent which is approximately three-sixteenths of an inch thick.

Also in the preferred embodiment, the support member 12 has a top edge margin 37, a bottom edge margin 39, and a middle portion 44 having the plurality of protrusions 14. Preferably, the top edge margin 37 and the bottom edge margin 39 formed at an approximate ninety degree angle which is substantially perpendicular to the middle portion 44 such that the support member 12 has a substantially U-shaped cross-section. Said formed top and bottom edge margins 37, 39 providing additional strength to the support member 12.

The formed top edge margin 37 of the support member 12 having a top semi-circular cutout 41 such that the top semi-circular cutout 41 is capable of receiving at least part of the bottom portion 59 of the cylindrical-shaped lever 16 and thereby providing additional support for the support member attachment means which join the support member 12 to the lever 16. The formed bottom edge margin 39 of the support member 12 having a bottom semi-circular cutout 43 such that the bottom semi-circular cutout 43 is capable of receiving another part of the bottom portion 59 of the cylindrical-shaped lever 16 and thereby also providing additional support for the support member attachment means which join the support member 12 to the lever 16. Preferably, the support member attachment means is a weld which joins the support member 12 to the lever 16.

The plurality of protrusions 14 positioned on the middle portion 44 of the support member 12 such that they are capable of being received within the plurality of elongated apertures 45 of the grain drill depth adjustment plate 30. This positioning roughly equating to the plurality of protrusions 14 being equally spaced around an arc of an imaginary circle having an approximate four inch radius as measured from the center of the imaginary circle to the maximum point of protrusion 49 of the plurality of protrusions 14 or their equivalent center points.

The support member 12 may be manufactured from different materials and in different sizes and shapes but is preferably formed from conventional plain carbon steel plate (e.g. 1020 steel or its equivalent) approximately three-sixteenths of an inch thick. The middle portion of the preferred support member substantially rectangular shaped and measuring approximately five inches by approximately two inches.

In other embodiments, the plurality of protrusions 14 can be separately formed and separately attached to the support member 12.

In alternate embodiments, the support member 12 may have no formed top and bottom edge margin 37, 39 and may consist of essentially just the middle portion 44, having the plurality of protrusions 14, attached to the lever 16.

Figure 10:
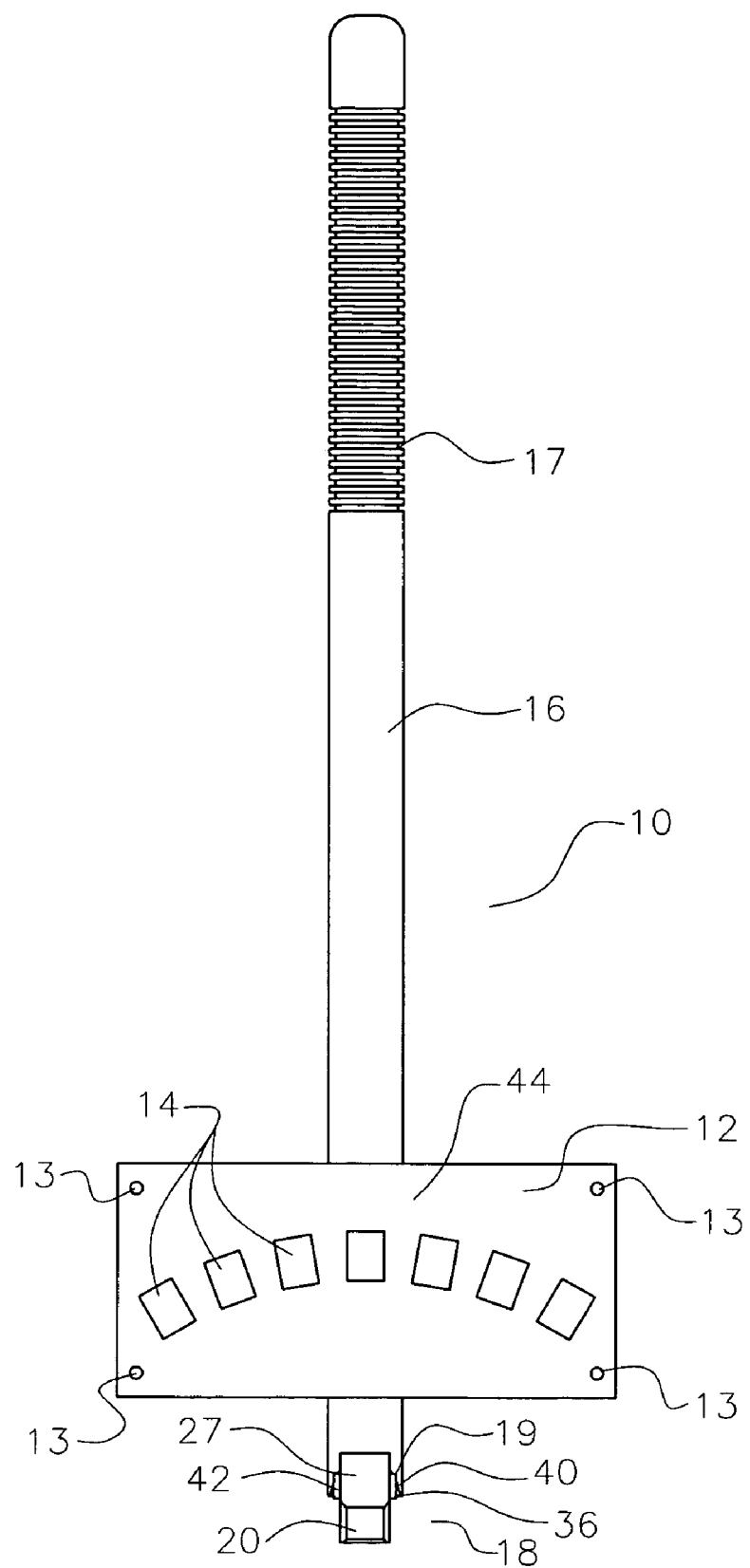
FIG. 10 is a top plan view of an alternate embodiment of the improved grain drill depth adjustment tool further illustrating the one or more support member stops.

Also, in an alternate embodiment, as shown in FIG. 10, the support member 12 may further comprise one or more support member stops 13 which would typically protrude less than the plurality of protrusions 14 and be capable of contacting the grain drill depth adjustment plate 30 such that the one or more support member stops 13 can control the depth of the plurality of protrusions 14 received within the plurality of elongated apertures 45. As such, the one or more support member stops 13 can thereby compensate for accumulations of dirt and debris on the grain drill depth adjustment assembly 29 when the protrusion depth of the plurality of protrusions 14 varies from the thickness of the grain drill depth adjustment plate 30, typically three-sixteenths of an inch.

In operation, an operator holds the improved grain drill depth adjustment tool 10 with one hand, preferably on the slip resistant surface 17 of the top portion of the lever 16, with its key member 27 and plurality of protrusions 14 facing the front side 31 of the grain drill depth adjustment plate 30. The grain drill depth adjustment tool 10 is initially held at an approximate thirty degree angle from a vertical axis such that the key member 27, attached to the bottom portion 59 of the lever 16 at an approximate thirty degree angle, is now essentially at a zero degree angle with the horizontal axis. The alignment point 20 of the key member 27 is inserted into the square-shaped aperture 34 of the grain drill depth adjustment plate 30 until the one or more key member stops 19 prevent further insertion and the first surface 21 adjacent the locking notch 22 engages the first edge margin 35 adjacent the square-shaped aperture 34 of the grain drill depth adjustment plate 30. The top portion 57 of the lever 16 is now pivoted towards the grain drill depth adjustment plate 30 such that the plurality of protrusions 14 of the support member 12 are received within the plurality of elongated apertures 45 of the grain drill depth adjustment plate 30 thereby compressing the spring-loaded pin 32 such that the spring-loaded pin 32 is no longer received within the plurality of elongated apertures 45 and the grain drill depth adjustment plate 30 is effectively released and unlocked. The grain drill depth adjustment tool 10 should now be in what is essentially an upright position with the lever 16 at an approximate zero degree angle to the horizontal axis. While continuing to maintain the grain drill depth adjustment tool 10 in this position, such that the spring-loaded pin 32 is still compressed, the grain drill depth adjustment tool 10 is rotated either clockwise or counter-clockwise thereby rotating the grain drill depth adjustment plate 30 on the pivot shaft/bearing assembly 55 and effectively changing the seeding depth. While maintaining the lever 16 at the approximate rotation position, the top portion 57 of the lever 16 can now be pivoted back and away from the grain drill depth adjustment plate 30 such that the plurality of protrusions 14 of the support member 12 are no longer received within the plurality of elongated apertures 45 of the grain drill depth adjustment plate 30 thereby releasing the spring-loaded pin 32 such that it can now be received within the plurality of elongated apertures 45 and the grain drill depth adjustment plate 30 is effectively re-locked. If after rotation, the spring-loaded locking pin 32 is not perfectly aligned with the plurality of elongated apertures 45 and is therefore not received within the plurality of elongated apertures 45, the lever 16 can still be rotated slightly until the spring-loaded pin 32 snaps into the plurality of elongated apertures 45 and effectively locks the grain drill depth adjustment plate 30.

From the foregoing description those skilled in the art will appreciate that all objects of the present invention are realized. An improved grain drill depth adjustment tools been shown and described which is capable of true one-handed adjustment of the grain drill depth adjustment plate in a relatively easy manner with less force required than with conventional adjustment methods thereby resulting in greatly increased efficiencies through significant time savings during the adjustment process. The preferred design of the present invention, as well as alterations that will now be apparent to those skilled in the art, all allow use of the tool with any equivalent adjustment plate on alternative farm equipment and/or other mechanical implements. The present invention, in alternate embodiments, is available in a variety of materials, shapes, and sizes.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A tool for unlocking a locked grain drill depth adjustment assembly comprising a grain drill depth adjustment plate, a spring-loaded locking pin, and a pivot shaft/bearing assembly, repositioning the depth adjustment plate and allowing the depth adjustment assembly to be re-locked with the depth adjustment plate in an alternate position, the tool comprising:

a lever having a top portion and a bottom portion;

a key member having a locking notch and one or more key member stops, the key member attached to the bottom portion of the lever such that the key member is capable of being at least partially received within a square-shaped aperture of the grain drill depth adjustment plate; and a support member having a plurality of protrusions positioned on the support member such that the plurality of protrusions correspond with a plurality of elongated apertures of the grain drill depth adjustment plate and are capable of being at least partially received within the plurality of elongated apertures of the grain drill depth adjustment plate when the key member is at least partially received within the square-shaped aperture of the grain drill depth adjustment plate, the plurality of protrusions further capable of fully compressing the spring-loaded pin of the grain drill depth adjustment assembly after the plurality of protrusions are fully received within the plurality of elongated apertures of the grain drill depth adjustment plate, the support member attached to the bottom portion of the lever.

2. The tool as defined in claim 1 wherein the key member is attached to the bottom portion of the lever at an approximate thirty degree angle.

3. The tool as defined in claim 2 wherein the key member has a first surface adjacent the locking notch, the locking notch positioned such that the first surface is essentially in vertical alignment with a maximum protrusion point of the plurality of protrusions, the first surface of the key member capable of engaging a first edge margin adjacent the square-shaped aperture of the grain drill depth adjustment plate.

4. The tool as defined in claim 3 wherein the one or more key member stops are essentially in vertical alignment with a minimum protrusion point of the plurality of protrusions, the one or more key member stops capable of engaging the first edge margin adjacent the square-shaped aperture of the grain drill depth adjustment plate.

5. The tool as defined in claim 4 wherein the one or more key member stops further comprises a stop pin, the stop pin received within a stop aperture of the bottom portion of the lever.

6. The tool as defined in claim 1 wherein the key member has an alignment point.

7. The tool as defined in claim 6 wherein the key member has an attachment pin opposite the alignment point; and wherein the bottom portion of the lever has a substantially square-shaped recess capable of at least partially receiving the key member, and an attachment aperture capable of at least partially receiving the attachment pin of the key member.

8. The tool as defined in claim 1 wherein the support member has one or more support member stops.

9. The tool as defined in claim 1 wherein the support member comprises a top edge margin, a bottom edge margin, and a middle portion having the plurality of protrusions; the top edge margin and bottom edge margin formed so that they are both substantially perpendicular to the middle portion of the support member such that the support member has a substantially U-shaped cross section.

10. The tool as defined in claim 9 wherein the lever is substantially cylindrical; and wherein the top edge margin of the support member has a top semi-circular cutout capable of receiving at least a part of the bottom portion of the lever; and the bottom edge margin has a bottom semi-circular cutout capable of receiving at least another part of the bottom portion of the lever.

11. A method for changing the seeding depth on a John Deere® Model 750 Grain Drill or its equivalent having a grain drill depth adjustment assembly primarily consisting of a pivot shaft/bearing assembly, a spring-loaded pin, and a grain drill depth adjustment plate with a plurality of elongated apertures and a square-shaped aperture, the steps comprising:

providing an improved grain drill depth adjustment tool comprising a lever having a top portion and a bottom portion; a key member having a locking notch and one or more key member stops, the key member attached to the bottom portion of the lever such that the key member is capable of being at least partially received within a square-shaped aperture of the grain drill depth adjustment plate; and a support member having a plurality of protrusions positioned on the support member such that they correspond with a plurality of elongated apertures of the grain drill depth adjustment plate and are capable of being at least partially received within the plurality of elongated apertures of the grain drill depth adjustment plate when the key member is at least partially received within the square-shaped aperture of the grain drill depth adjustment plate, the plurality of protrusions further capable of fully compressing the spring-loaded pin of the grain drill depth adjustment assembly after being fully received within the plurality of elongated apertures of the grain drill depth adjustment plate, the support member attached to the bottom portion of the lever;

holding the improved grain drill depth adjustment tool by the top portion of the lever with one hand;

positioning the improved grain drill depth adjustment tool such that the key member and the plurality of protrusions face a front side of the grain drill depth adjustment plate, the lever of the improved grain drill depth adjustment tool is at an approximate thirty degree angle from a vertical axis, and the key member is essentially opposite the square-shaped aperture of the grain drill depth adjustment plate;

inserting the key member into the square shaped aperture until the one or more key member stops prevent further insertion and a first surface of the locking notch engages a first edge margin adjacent the square-shaped aperture of the grain drill depth adjustment plate;

pivoting the top portion of the lever towards the grain drill depth adjustment plate so that the improved grain drill depth adjustment tool is essentially in an upright position with the lever at an approximate zero degree angle to the horizontal axis such that the plurality of protrusions of the support member are received within the plurality of elongated apertures of the grain drill depth adjustment plate thereby compressing the spring-loaded pin such that the spring loaded pin is no longer received within the plurality of elongated apertures and the grain rill depth adjustment plate is effectively released and unlocked;

maintaining the pivot position such that the spring-loaded pin stays compressed;

rotating the lever in either a clockwise or counter-clockwise direction thereby rotating the grain drill depth adjustment plate on the pivot shaft/bearing assembly such the seeding depth is changed;

maintaining the rotation position such that the grain drill depth adjustment plate stays at the changed seeding depth position;

pivoting the top portion of the lever away from the grain drill depth adjustment plate such that the plurality of protrusions of the support member are no longer received within the plurality of elongated apertures of the grain drill depth adjustment plate thereby releasing the spring-loaded pin such that the spring-loaded pin can is now received within the plurality of elongated apertures and the grain drill depth adjustment plate is effectively re-locked.

12. A method for changing the seeding depth on a John Deere® Model 750 Grain Drill or its equivalent, as set forth in claim 11, the steps further comprising:

Rotating the lever slightly in either a clockwise or counter-clockwise direction such that the spring-loaded pin, if not previously perfectly aligned with the plurality of protrusions of the grain drill depth adjustment plate, snaps into the plurality of protrusions and effectively re-locks the grain drill depth adjustment plate.

* * * * *